(12) United States Patent
Karki et al.

(10) Patent No.: US 11,237,045 B1
(45) Date of Patent: Feb. 1, 2022

(54) TELESCOPING LIGHT SENSOR MOUNT ABOVE GROWTH CANOPY

(71) Applicant: Earth Scout, GBC, Minneapolis, MN (US)

(72) Inventors: Dipesh Karki, Minneapolis, MN (US); Troy Schmidtke, Minneapolis, MN (US); Michael Immer, Minneapolis, MN (US); Christopher Burg, Minneapolis, MN (US)

(73) Assignee: Earth Scout GBC, Minneapolis, MN (US)

( * ) Notice: Subject to any disclaimer, the term of this patent is extended or adjusted under 35 U.S.C. 154(b) by 0 days.

(21) Appl. No.: 16/953,630

(22) Filed: Nov. 20, 2020

(51) Int. Cl.
  *G01J 1/02* (2006.01)
  *G01J 1/42* (2006.01)
  *H04W 76/10* (2018.01)

(52) U.S. Cl.
  CPC ........... *G01J 1/0271* (2013.01); *G01J 1/4204* (2013.01); *H04W 76/10* (2018.02)

(58) Field of Classification Search
  CPC ................. G01J 1/0271; G01J 1/0204; G01J 2001/0257; G01J 1/02; G01J 1/4204; G01J 1/42; H04W 76/10
  See application file for complete search history.

(56) References Cited

U.S. PATENT DOCUMENTS

| | | | |
|---|---|---|---|
| 4,998,826 A | 3/1991 | Wood et al. | |
| 5,049,896 A | 9/1991 | Conley | |
| 6,216,795 B1 | 4/2001 | Buchl | |
| 6,525,276 B1 | 2/2003 | Vellidus et al. | |
| 6,986,294 B2 | 1/2006 | Fromme et al. | |
| 7,080,816 B1 | 7/2006 | Vaccaro | |
| 7,617,992 B2 | 11/2009 | Ivans | |
| 7,852,271 B2 | 12/2010 | Grunig et al. | |
| 7,896,299 B2 | 3/2011 | Chinuki et al. | |
| 7,932,451 B2 | 4/2011 | Workman et al. | |
| 8,262,517 B2 | 9/2012 | Balasubramanyan | |
| 8,698,695 B2 | 4/2014 | Wyckoff et al. | |
| 9,000,988 B2 | 4/2015 | McGuire | |
| 9,107,354 B2 * | 8/2015 | Martin | A01G 25/167 |
| 9,146,370 B2 | 9/2015 | Inoue et al. | |
| 9,244,192 B2 | 1/2016 | Cullen et al. | |
| 9,320,356 B2 | 4/2016 | Ralstin | |
| 9,374,950 B2 | 6/2016 | Upadhyaha et al. | |
| 9,490,525 B2 | 11/2016 | Harmelink et al. | |
| 9,581,342 B2 | 2/2017 | Daniels et al. | |
| 9,657,926 B2 | 5/2017 | Steele | |
| 9,675,146 B1 | 6/2017 | Howell | |
| 9,732,902 B2 | 8/2017 | Schutz et al. | |
| 9,804,097 B1 | 10/2017 | Tang et al. | |
| 9,894,852 B2 | 2/2018 | Gilbert et al. | |
| 10,134,312 B2 | 11/2018 | Guinn et al. | |
| 10,386,296 B1 | 8/2019 | Wolf | |
| 10,492,361 B2 | 12/2019 | Schildroth et al. | |

(Continued)

*Primary Examiner* — John R Lee
(74) *Attorney, Agent, or Firm* — Dietz Law Office LLC

(57) ABSTRACT

A telescoping sensor mount capable of systematically extending a sensor above a crop growth canopy. The telescoping sensor mount of the invention includes a foldaway tripod support system and is further capable of being powered with solar energy. The sensor mount and support are capable of extension and retraction and provide a solid base support for the sensors.

17 Claims, 9 Drawing Sheets

(56) References Cited

U.S. PATENT DOCUMENTS

| | | | |
|---|---|---|---|
| 2007/0013897 A1* | 1/2007 | Webbeking | G01J 1/0271 |
| | | | 356/222 |
| 2012/0181979 A1* | 7/2012 | Hudspeth | F16M 11/245 |
| | | | 320/108 |
| 2012/0262304 A1* | 10/2012 | Cripps | G08G 1/0955 |
| | | | 340/908 |
| 2016/0312967 A1* | 10/2016 | Harvey | F21V 17/007 |
| 2020/0090482 A1* | 3/2020 | Stibich | G08B 17/10 |
| 2020/0096333 A1* | 3/2020 | Nishita | G01C 15/002 |
| 2020/0191343 A1* | 6/2020 | Zhou | F21V 21/10 |
| 2020/0257018 A1* | 8/2020 | Bhaganagar | G01N 25/18 |
| 2020/0401015 A1* | 12/2020 | Munoz | H04N 5/232061 |
| 2021/0000019 A1* | 1/2021 | Golle | F21V 33/006 |
| 2021/0045301 A1* | 2/2021 | Shakoor | A01G 25/167 |
| 2021/0183081 A1* | 6/2021 | Wohlfeld | G01S 7/4817 |

* cited by examiner

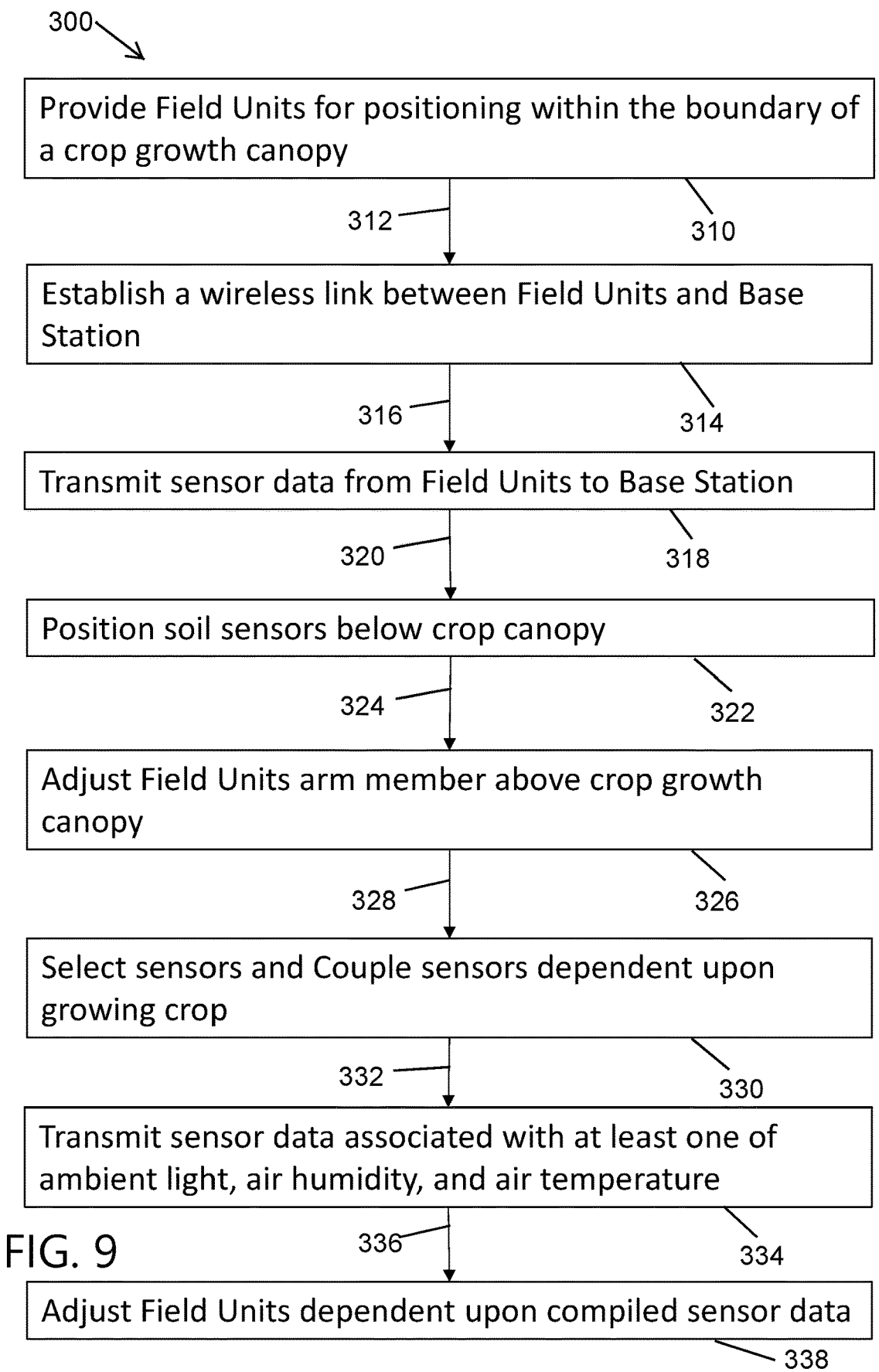

– 1 –

TELESCOPING LIGHT SENSOR MOUNT ABOVE GROWTH CANOPY

CROSS-REFERENCE TO RELATED APPLICATIONS

Not Applicable

FEDERAL SPONSORSHIP

Not Applicable

JOINT RESEARCH AGREEMENT

Not Applicable

TECHNICAL FIELD

This invention pertains generally to agriculture field sensor units. More particularly, the invention pertains to a sensor mount and support that elevates one or more sensors above a crop growth canopy and communicates sensor information to a base station. The sensor mount and support are capable of extension and retraction and provide a solid base support for the sensors when subjected to heavy winds and other inclement weather.

BACKGROUND

Over the years various systems have been implemented to monitor crop growth and field conditions. Various crop monitoring practices have required stationary sensors positioned in the field. However, certain agriculture crop field sensors have had limited effectiveness over the life cycle of the crop. As the crop begins to grow the height of the crop canopy may interfere with desired sensor data. By way of example, a temperature sensor or light sensor covered by a crop canopy may provide data points that vary significantly from a temperature sensor or light sensor positioned above the growth canopy. The grower may be more interested in knowing data related to temperature, humidity and light conditions of air above the crop field rather than under the growth canopy. However, as the crop grows the sensors may be covered by crop canopy. Further, it may be preferred to make crop management decisions relying upon sensor data correlating with air above the growth canopy rather than sensor data measured under a growth canopy.

Also, adverse weather conditions may require significant maintenance of the sensors positioned in the field. The present invention assists the grower when needing to locate the sensors. Additionally, sensors may be positioned in remote areas of a field making light weight sensors and systems preferable, however prior lightweight devices have had a tendency to require increased maintenance throughout the growing season. It is desirable to provide a sturdy yet lightweight sensor mount capable of continuous orientation of the sensor above the crop growth canopy. Further, at times, it may be preferred to be able to remotely activate the sensor mount. For example, the sensor mount may be secured in an agriculture growing zone, at a location, making the conditions less than ideal to manually raise or lower the sensor mount. The present invention is further desirable to provide a stable sensor mount that withstands inclement weather and strong winds but is also quickly and easily relocated.

SUMMARY

Embodiments according to aspects of the invention are capable of raising or lowering a sensor positioned above a crop growth canopy. According to other aspects, the apparatus of the invention is capable of being activated remotely and may be remotely raised or lowered relative to a crop growth canopy. Further, the invention may also utilize a method for continuously positioning a sensor above a crop growth canopy. These and other embodiments according to aspects of the invention include an apparatus having an extendable pole, an arm member extending outward from an upper end of the pole, a sensor mount, a support having actuating legs, and a remote data transmit module housing. The extendable pole is capable of extending between a lowered and raised position. The extendable pole also has a coupling to secure the pole in a fixed lowered position and a fixed raised position. The sensor mount is positioned at an outer end of the arm member and is adapted for retaining a sensor. The support has a central column, an upper spacer member slidingly coupled to the central column, a lower spacer member slidingly coupled to the central column below the upper spacer member, and at least three folding legs linked to the central column. Each leg has an end portion rotationally joined to the upper spacer member and also has a mid-portion rotationally joined to the lower spacer member. The remote data transmit module housing is coupled to an upper end of the central column of the support member, and both the support and the remote data transmit module housing are releasably engaged to the extendable pole.

According to aspects of the invention, the invention may further include clamps integral with the upper spacer member to restrict rotation of the legs. Also, the upper spacer member may include fingers extending outwardly from a central portion of the upper spacer member, such that the fingers are adapted for gripping a sensor. Further, a linkage may be provided that links the mid-portion of each leg to the lower spacer member. Also, slots may be formed in the upper spacer member wherein the slots are adapted for receiving a sensor probe. In certain embodiments the sensor may be the type capable of communicating with the remote data transmit module.

In use, at least one field unit is provided for positioning within a boundary of a crop growth canopy. Each field unit includes an extendable pole, an arm member, a sensor mount, a support and a remote data transmit sensor housing. The extendable pole is capable of extending between a lowered and raised position. The extendable pole also has a coupling to secure the pole in a fixed lowered position and a fixed raised position. The arm member extends outward from an upper end of the pole. The sensor mount is positioned at an outer end of the arm member. The support has a central column, an upper spacer member slidingly coupled to the central column, a lower spacer member slidingly coupled to the central column below the upper spacer member, and at least three folding legs linked to the central column. Each leg has an end portion rotationally joined to the upper spacer member and each leg has a mid-portion rotationally joined to the lower spacer member. The remote data transmit module housing is coupled to an upper end of the central column of the support member. Both the support and the remote data transmit module housing are releasably engaged to the extendable pole and the arm member is adjustable to remain above the crop growth canopy.

Once the field units are positioned within the crop growth canopy the field unit is wirelessly linked to a base station. Data from one or more sensors is transmitted from the field unit to the base station. The sensors are chosen dependent upon the crop being monitored and may include humidity sensors, soil moisture sensors, soil salinity sensor, temperature sensors, lights sensors, aeration sensor, to name just a few sensors known to crop growers. At least one of the sensors may be coupled to the arm member and the arm member may be adjusted to remain above the crop growth canopy. Data from the sensors is transmitted from the field unit to the base station. In accordance with aspects of the invention the transmitted data may be associated with at least one of ambient light, air humidity, and air temperature. The arm member may be further adjusted dependent upon a compilation of data from the field units.

The accompanying drawings, which are incorporated in and constitute a portion of this specification, illustrate embodiments of the invention and, together with the detailed description, serve to further explain the invention. The embodiments illustrated herein are presently preferred; however, it should be understood, that the invention is not limited to the precise arrangements and instrumentalities shown. For a fuller understanding of the nature and advantages of the invention, reference should be made to the detailed description in conjunction with the accompanying drawings.

DESCRIPTION OF THE DRAWINGS

In the various figures, which are not necessarily drawn to scale, like numerals throughout the figures identify substantially similar components.

FIG. 9 is a flow chart of an embodiment of a method in accordance with the present invention.

DETAILED DESCRIPTION

The following description provides detail of various embodiments of the invention, one or more examples of which are set forth below. Each of these embodiments are provided by way of explanation of the invention, and not intended to be a limitation of the invention. Further, those skilled in the art will appreciate that various modifications and variations may be made in the present invention without departing from the scope or spirit of the invention. By way of example, those skilled in the art will recognize that features illustrated or described as part of one embodiment, may be used in another embodiment to yield a still further embodiment. Thus, it is intended that the present invention also cover such modifications and variations that come within the scope of the appended claims and their equivalents.

The field unit 10 of the present invention is particularly well suited for remote transmission of crop growth and field condition data or information to a base unit 220. Depending upon the crop being grown, the desirable height of the sensors above the crop growth canopy may be varied. The field unit 10 is particularly well suited to maintain selected sensors at a desired height above a crop growth canopy. Also, the field unit provides a stable sensor mount that reduces the need for continuous maintenance. With reference to the Figures, various embodiments according to aspects of the invention will be described in greater detail.

Figure 1:
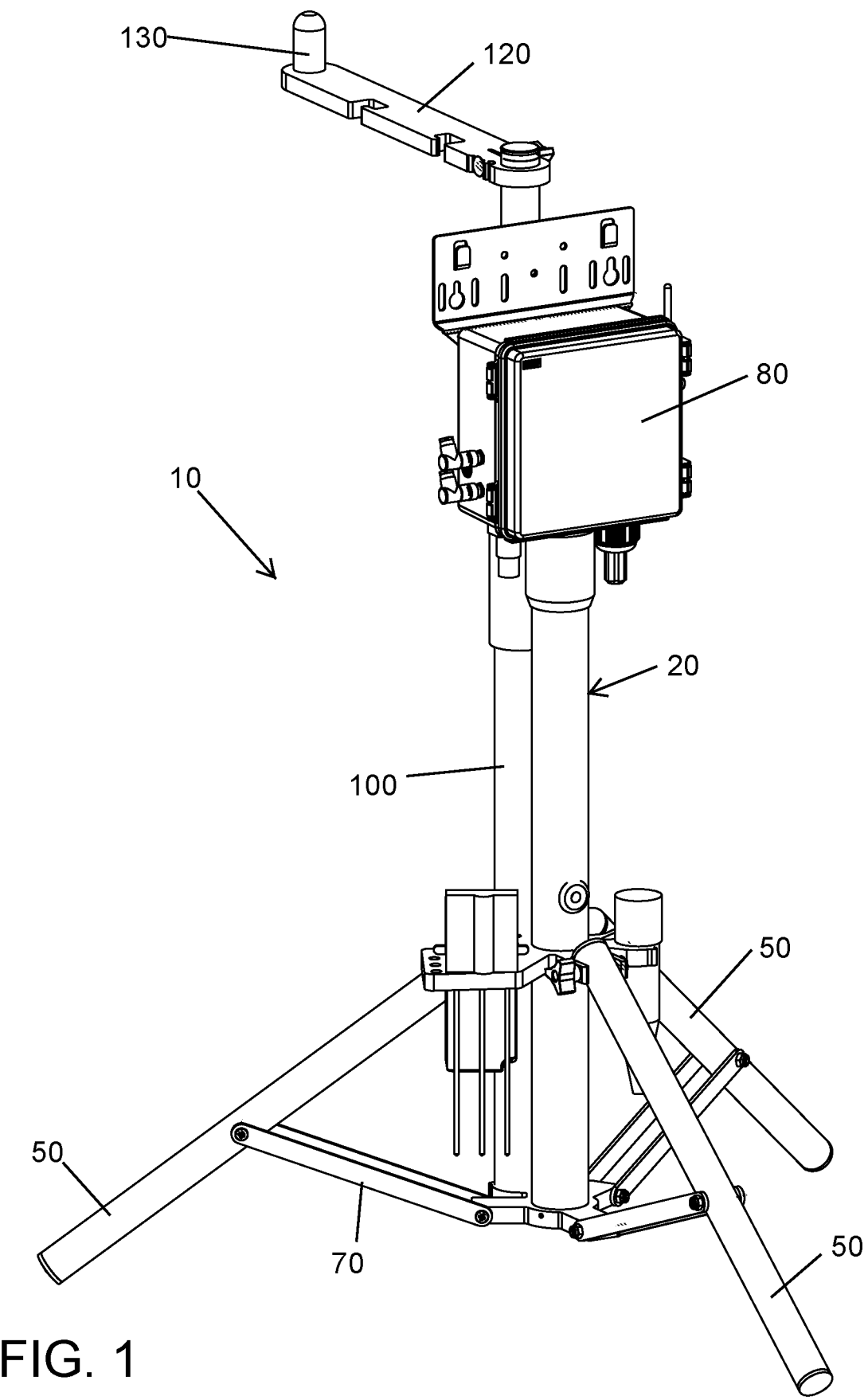
FIG. 1 is a front perspective view of a field unit mount of the present invention shown in a lowered wide position.
Figure 2:
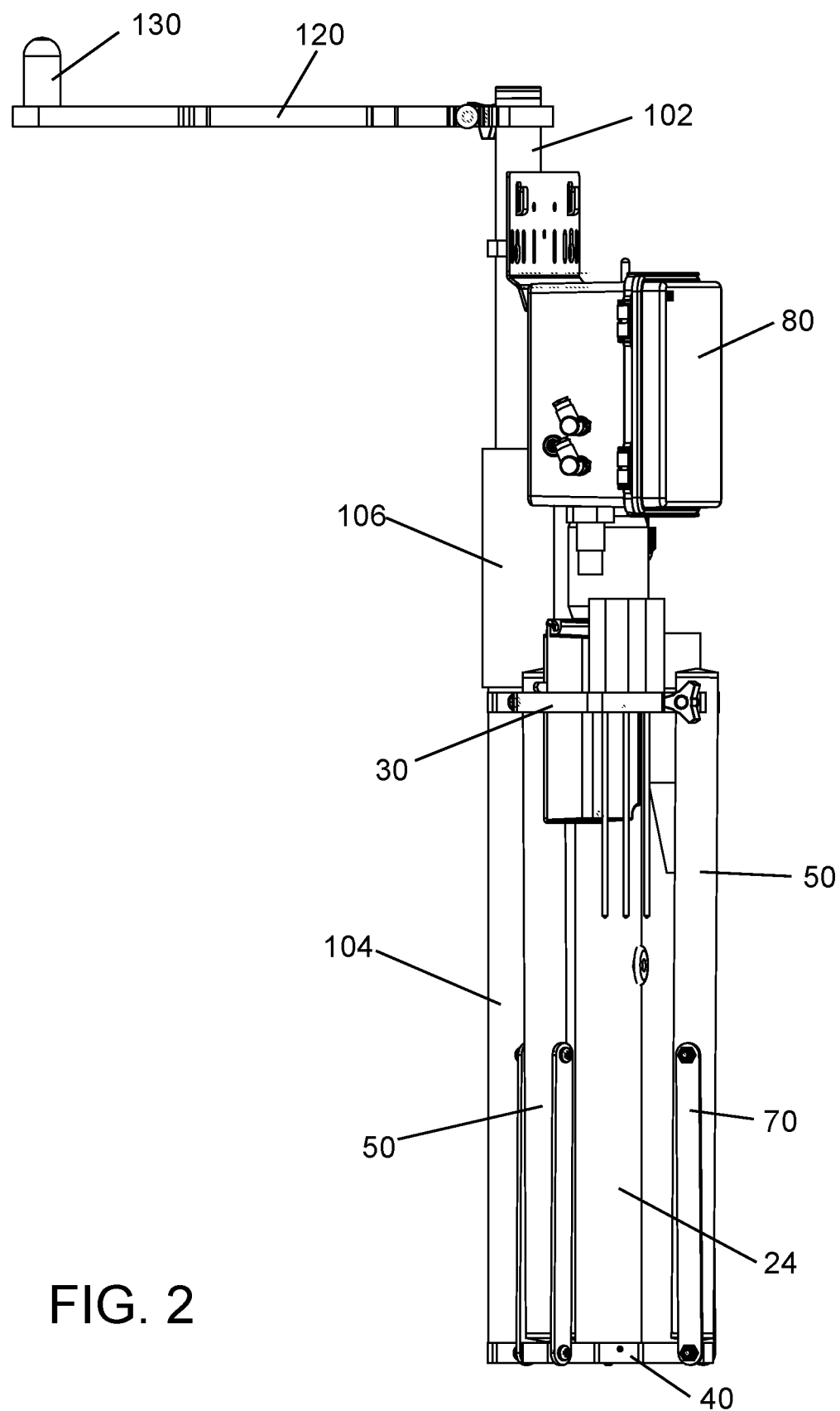
FIG. 2 is a side perspective view of a field unit mount remote of the present invention shown in a lowered narrow position.
Figure 3:
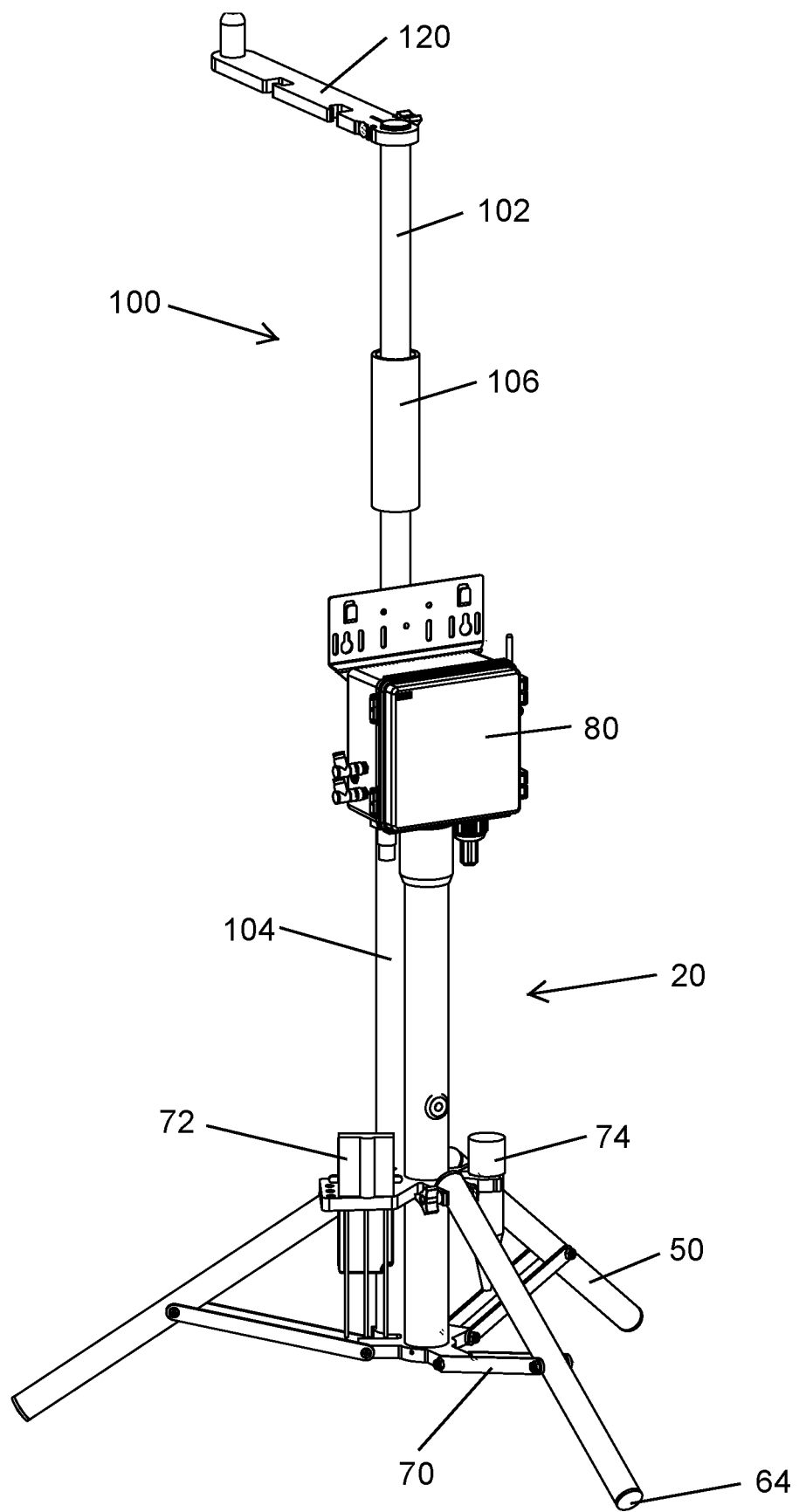
FIG. 3 is a perspective view of a field unit mount of the present invention shown in an extended wide position.
Figure 4:
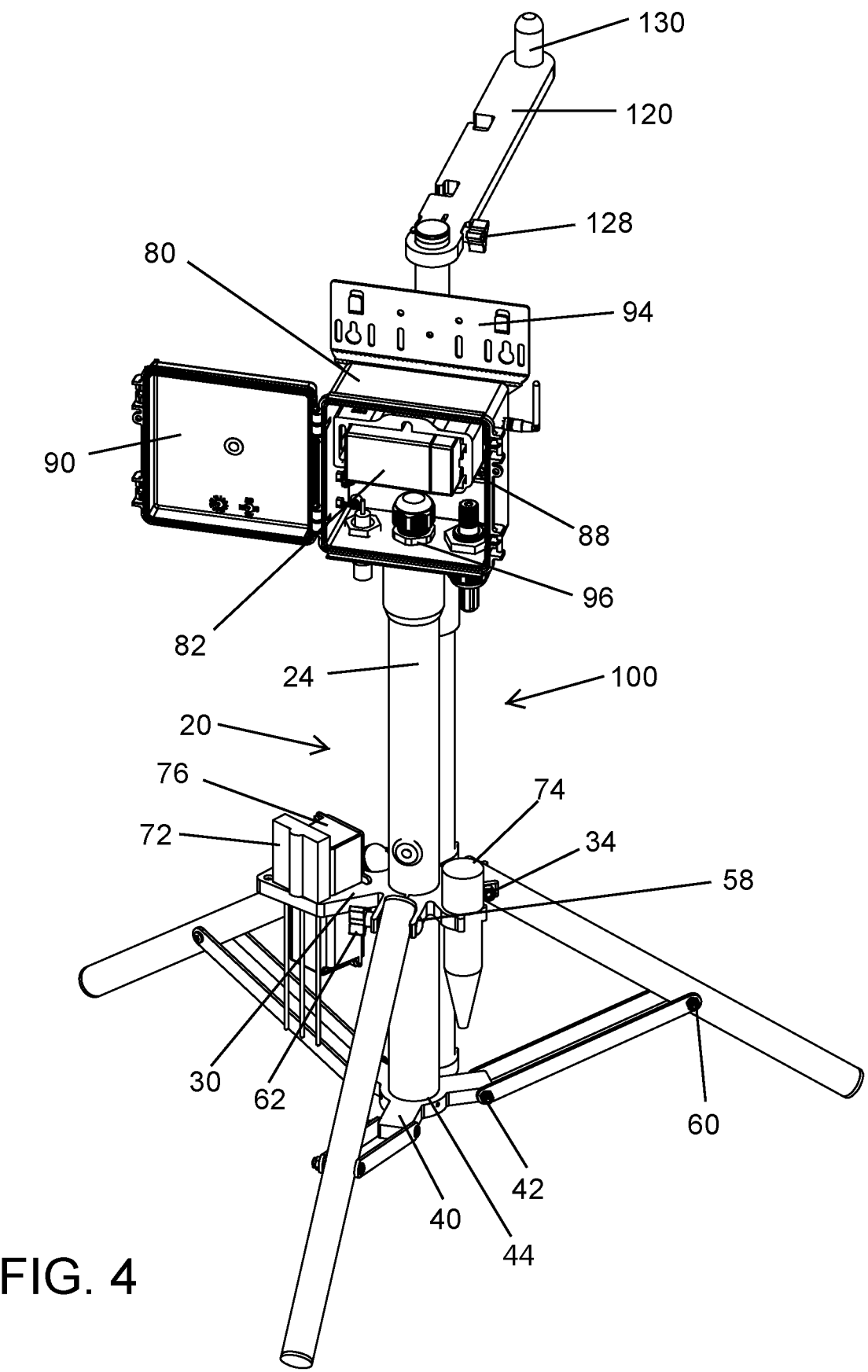
FIG. 4 is an upper perspective view of a field unit mount of the present invention shown in a lowered wide position and showing the remote data transmit module housing in an open position.
Figure 5:
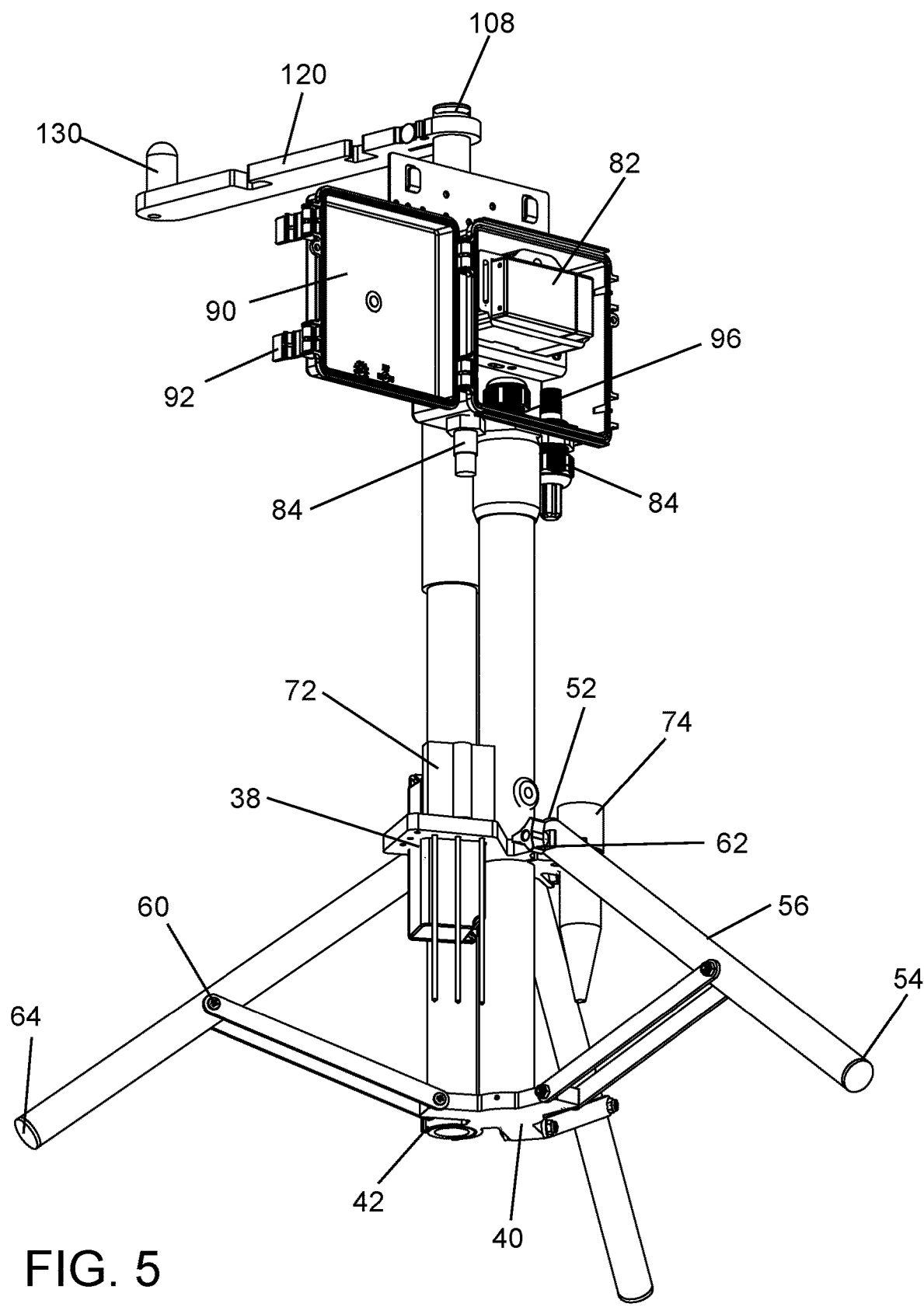
FIG. 5 is a lower perspective view of a field unit mount of the present invention shown in a lowered wide position and showing the remote data transmit module housing in an open position.
Figure 6:
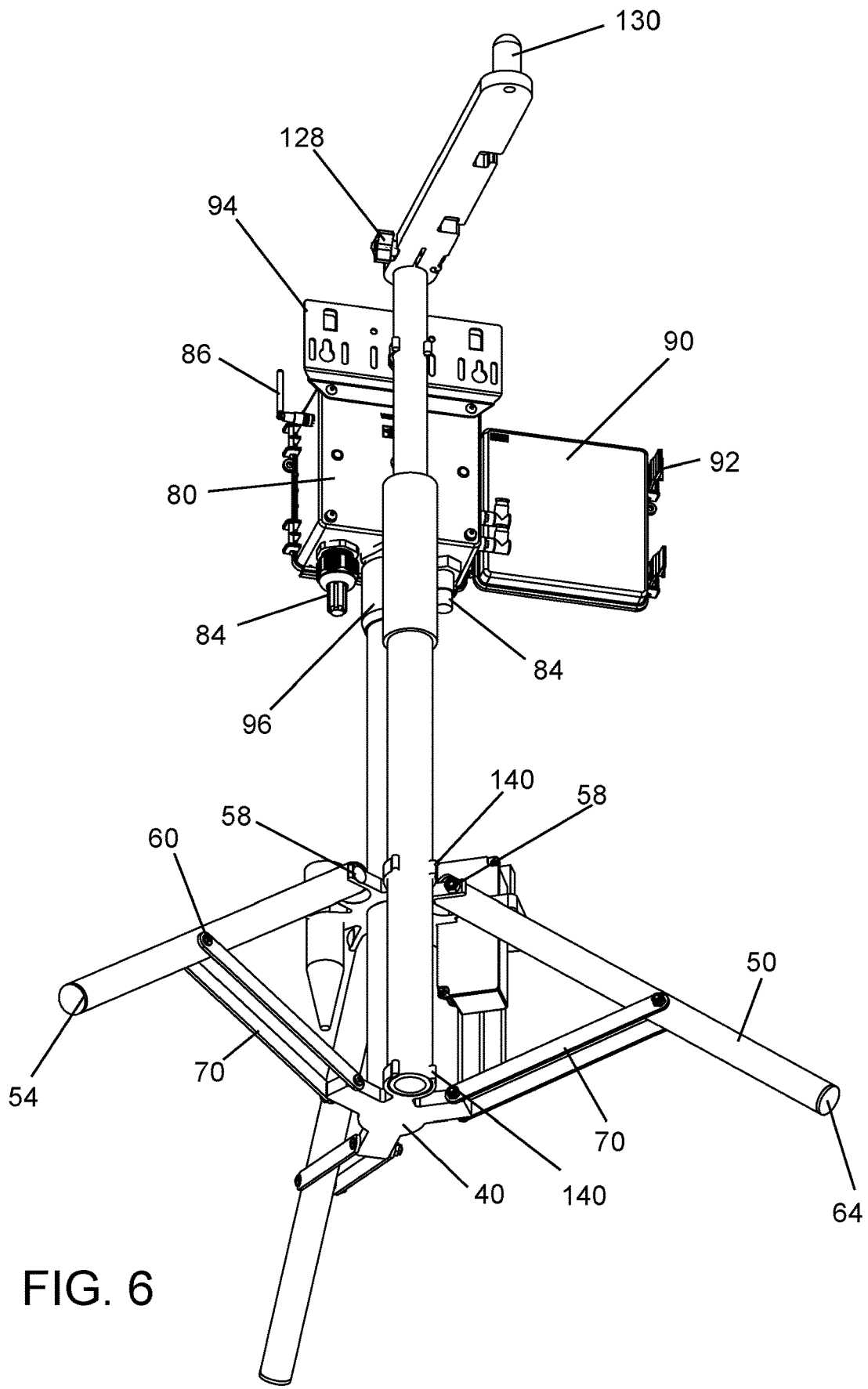
FIG. 6 is a lower back perspective view of a field unit mount of the present invention shown in a raised wide position.
Figure 7:
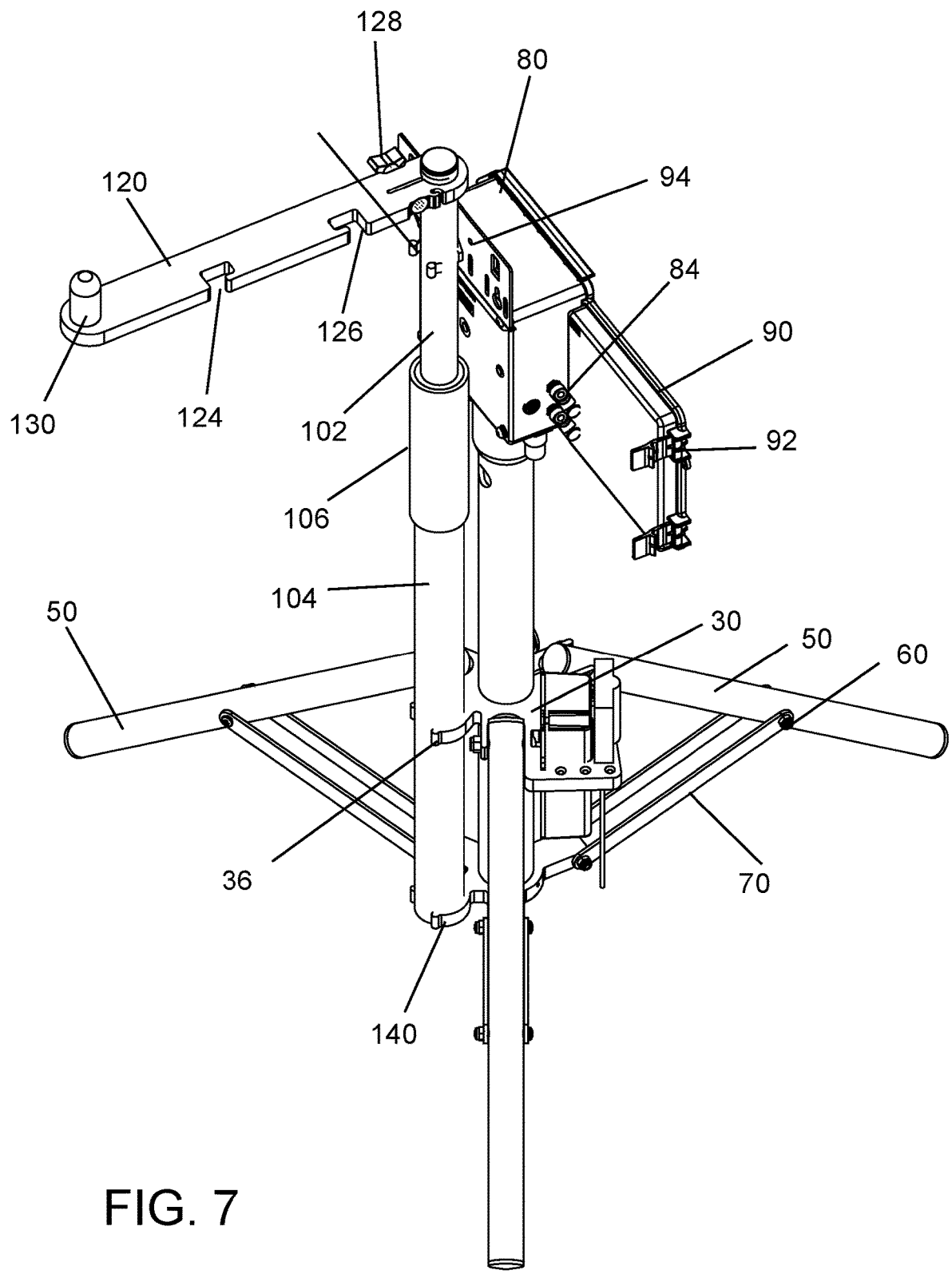
FIG. 7 is an upper side perspective view of a field unit mount of the present invention shown in a raised wide position.

With reference to FIGS. 1-3, a field unit 10 is shown having the support 20 in the expanded (FIGS. 1 and 3) and contracted (FIG. 2) positions and the telescoping pole 100 in the extended (FIG. 3) and retracted position (FIGS. 1 and 2). The flexibility of the field unit allows a user to adjust the unit dependent upon the field terrain and crop growth height. The support 20 includes a central column 24, an upper spacer member 30, a lower spacer member 40, and legs 50 rotationally coupled to the upper and lower spacer members. The rotational coupling of the legs to the support members generally includes linkage 70 and a joint or pins 58 and 60. Remote data transmit module housing 80 and pole 100 are coupled to the central column 24 of the support 20. An arm member 120 is fixed to an upper end of pole 100 and a sensor 130 is fixed to an outer end of the arm member 120. Sensors 72 and 74 are shown attached to the upper spacer member 30. The field unit 10 may further include a wireless controlled actuator of suitable construction to raise and lower the pole and may further include a solar panel of known suitable construction coupled to the remote data transmit module to provide power to the actuator, sensors and wireless remote data transmit module. The wireless aspect of the invention may include wi-fi, z-wave, cellular, Bluetooth or other wireless systems capable of transmitting and receiving data and commands (one such embodiment being represented in field use schematic 200). Operating system apps may also be utilized to create additional functionality for the module.

With reference now to FIGS. 4-7 the upper spacer member 30 includes a central aperture 32 extending through the spacer member 30 through which central column 24 slides. Similarly, lower spacer member 40 includes a central aperture 44 partially extending through the spacer member 30. Column 24 fits into aperture 44 and the bottom of column 24 rests upon the lower spacer member 40. Fingers 34 are formed in the upper spacer member 30 and are well suited to firmly grasp soil oxygen sensor 74. Additional fingers or clamps 36 and 140 are formed in the upper and lower support members 30 and 40 respectively. The fingers or clamps are sized to firmly grasp lower section 104 of extendable pole 100. Slots 38 are formed in the upper support member 30 and are adapted for receiving additional sensor 72 and module 76. Lower spacer member 40 includes rotational joint 42 that receives upper or fixed end 52 of leg 50. The lower or ground end 54 of the legs 50 includes a plug 64 that inserts into the open end of the leg 50 and blocks soil from inserting into hollow legs 50. Alternatively, the plug 64 may be substituted with a tine stile end for each leg to allow a user to push the tine and secure each leg to the ground. A mid portion 56 of each leg includes a rotational joint 60 and the end 52 of each leg includes a rotational joint 58. Clamps 62 secure the end 52 to the upper member 30. Linkage 70 is rotationally fixed to the lower spacer member 40 at rotational joint 42 and an opposite end of the linkage is rotationally fixed to the mid rotational joint 60 of the leg 50. As the upper member 30 slides up the central column 24 the legs 50 contract inwards and as the upper member 30 slides downward the legs 50 rotate and expand outward.

Remote data transmit module includes housing 80 that is connected to the central column 24 with a fixed ring 96 that engages with the column 24 to fix the housing 80 relative to the column. Mounting bracket 94 and clamp 140 further provide a mechanism to mount the housing or engage the housing 80 with the extendable pole 100. Housing 80 encloses a power supply 82 and integrated circuit 88. Electrical interconnects 84 provide physical interconnects between a variety of sensors and the integrated circuit. The control board or circuit 88 also has the capability to wirelessly connect sensors having wireless transmitters. Antenna 86 assists the transmission of data or information collected from the sensors from the control board 88 to a base station 220. The housing 80 further includes a hinged 90 having latches 92 wherein when the door is closed the door is sealed to the housing to prevent moisture from entering into the housing.

Extendable pole 100 includes a first section 102 and second section 104 that are coupled together via coupling 106. In the embodiment illustrated in the Figures, the first section has a diameter that is less than the inner diameter of the second section 106, thereby allowing the first section to extend in and out of the second section. Other known extendable poles of different construction may be utilized without department from the scope of the invention. An upper portion 108 of the first section 102 is fixed to arm member 120 by a clamp 128. The clamp may be loosened and the arm member 120 may be removed from the pole 100. Slots 124 and 126 formed in the arm member may be utilized to hang the arm member 120 on the support 20 when collapsing and storing the field unit 10. Alternatively, the slots 124 and 126 may be utilized to engage and support additional sensors on arm 120. Sensor 130 is positioned on the outer end of arm member 120 to avoid interference with the remote data transmit module electronics and other sensors. In use, one or more field units 10 may be positioned in a crop field. Sensors are positioned in the ground or on the support 20 and activated.

Figure 8:
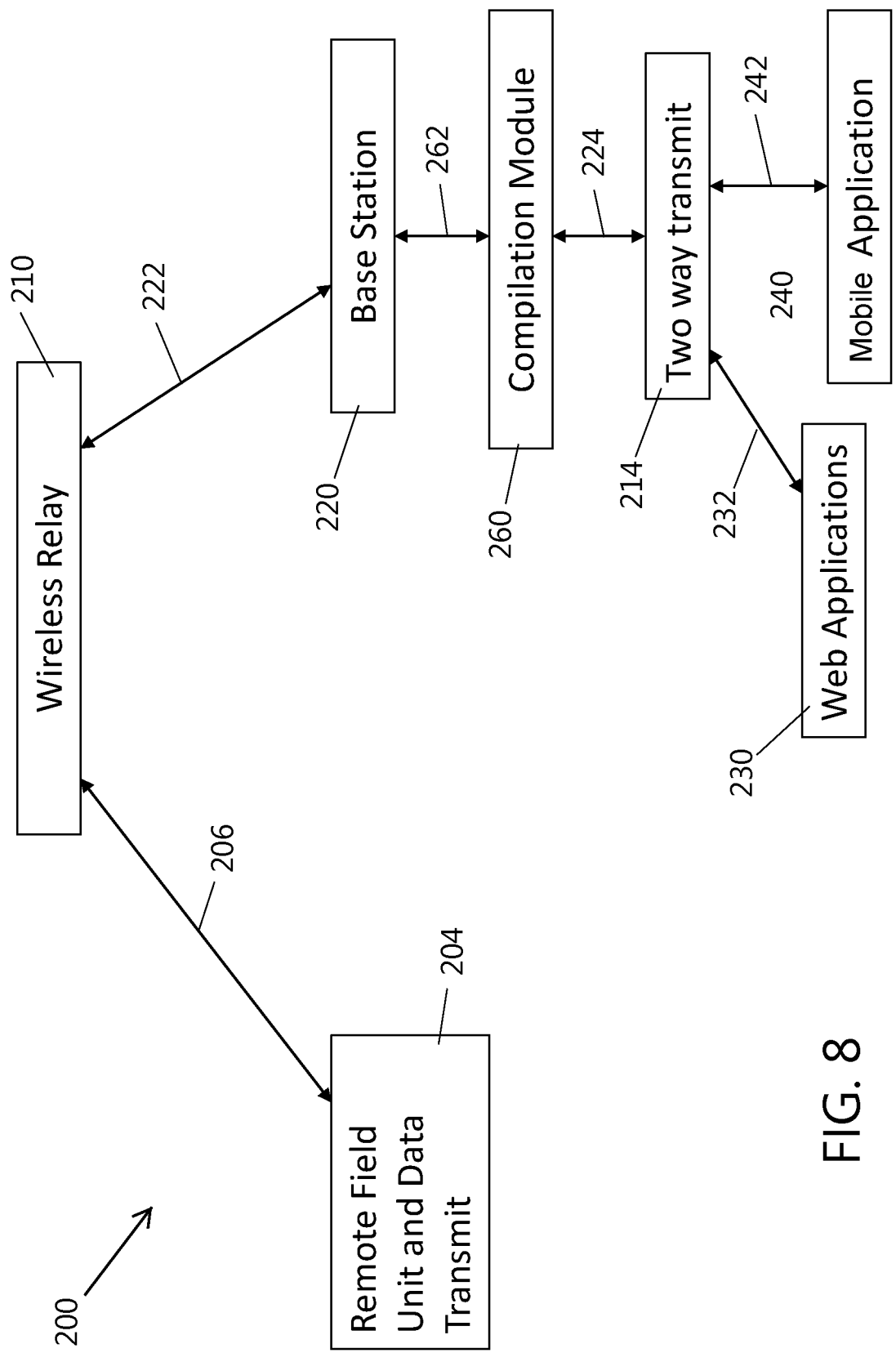
FIG. 8 is a schematic of an embodiment of a remotely operable field unit and base station in accordance with the present invention.

With reference to FIG. 8, once the sensors are activated, the remote data transmit module of the field unit 10 transmits and receives (represented by 206) data or information from wireless relay 210. The wireless relay 210, in turn, transmits and receives data 222 from base station or server 220. Base station 220 is interconnected 262 with a compilation module 260 that is coupled 224 to a two way transmit 214. The two way transmit 214 is coupled at 232 to internet or web applications 230 and may be coupled at 242 to mobile applications 240. Both the web applications 230 and mobile applications 240 are linked or coupled to compilation module 260 through the base station or server 220. The coupling and interplay of electronic components allows a grower to seamlessly access data or information from the field unit 10 and further control the height of the extendable pole 100 above the ground.

By way of example and without limitation intended, one example of using the field unit 10 will be described in conjunction and reference to the flowchart 300 illustrated in FIG. 9. Field units 10 are provided to growers for positioning within the boundary of a crop growth canopy 310. The particular crop to be monitored and position within the crop field is determined by the grower. Once the field units 10 are positioned within the field 312, a wireless link is established 314 between the field units 10 and base station 220. With a link established 316, sensor data or information is transmitted 318 from the field units 10 to the base station 220. The data is organized and further compiled and is accessible by the grower through a link to a web app or mobile app such as a phone app. The soil sensors are positioned below the crop canopy (illustrated in the flow by 320, 322, and 324) and the field unit's 10 arm member 120 is adjusted at a preferred height above the crop growth canopy (322 and 324). The preferred height is dependent upon the particular crop and the type of sensors sensing above the crop growth canopy. The sensors are selected and coupled to the field unit 10 in accordance with the particular crop being monitored (330 and 332). Depending upon the particular activated sensors, data or information associated with ambient light, air humidity, and air temperature above the crop growth canopy may be transmitted from the remote data transmit module of each field unit 10 to the base station 220 (see steps 334 and 336). The field units 10 may be adjusted automatically or manually dependent upon compiled sensor data 338.

By way of example and without limitation intended, a grower may position multiple field units 10 in a vineyard along a slope of the hillside or field. The grower may select sensors to monitor the moisture and oxygen levels within the soil next to a selected vine but may also desire monitoring of the air temperature, amount of light exposure, and humidity above the height of the vine. The height of the sensor arm for each field unit may be adjusted dependent upon the height of the nearby vines. The grower may monitor data from each field unit and may, for example, make irrigation and fertilization decision dependent upon the compiled data resulting from the information obtained from the field units. Further, information from the field units assist the grower in determining variations in vine growth dependent upon location of the vine within the field. This information may be helpful in accessing future irrigation or fertilization plans.

These and various other aspects and features of the invention are described with the intent to be illustrative, and not restrictive. This invention has been described herein with detail in order to comply with the patent statutes and to provide those skilled in the art with information needed to apply the novel principles and to construct and use such specialized components as are required. It is to be understood, however, that the invention can be carried out by specifically different constructions, and that various modifications, both as to the construction and operating procedures, can be accomplished without departing from the scope of the invention. Further, in the appended claims, the transitional terms comprising and including are used in the open ended sense in that elements in addition to those enumerated may also be present. Other examples will be apparent to those of skill in the art upon reviewing this document.

What is claimed is:

1. An apparatus for elevating a sensor above a crop growth canopy, the apparatus comprising:
    an extendable pole capable of extending between a lowered and raised position, the extendable pole having a coupling to secure the pole in a fixed lowered position and a fixed raised position;
    an arm member extending outward from an upper end of the pole;
    a sensor mount positioned at an outer end of the arm member;
    a support having a central column, an upper spacer member slidingly coupled to the central column, a lower spacer member slidingly coupled to the central column below the upper spacer member, and at least three folding legs linked to the central column, wherein each leg having an end portion rotationally joined to the upper spacer member and having a mid-portion rotationally joined to the lower spacer member;

a remote data transmit module housing coupled to an upper end of the central column of the support member; and wherein the support and the remote data transmit module housing are releasably coupled to the extendable pole.

2. The apparatus as recited in claim 1, further including clamps integral with the upper spacer member to restrict rotation of the legs.

3. The apparatus as recited in claim 2, wherein the upper spacer member further includes fingers extending outwardly from a central portion of the upper spacer member, wherein the fingers are adapted for gripping a sensor.

4. The apparatus as recited in claim 1, further including a linkage that links the mid-portion of each leg to the lower spacer member.

5. The apparatus as recited in claim 1, further including slots formed in the upper spacer member wherein the slots are adapted for receiving a sensor probe.

6. The apparatus as recited in claim 3, wherein the sensor is of the type capable of communicating with the remote data transmit module.

7. An apparatus for elevating a sensor above a crop growth canopy, the apparatus comprising:

an extendable pole capable of extending between a lowered and raised position, the extendable pole having a coupling to secure the pole in a fixed lowered position and a fixed raised position;

an arm member extending outward from an upper end of the pole;

a light sensor mount positioned at an outer end of the arm member;

a support having a central column, an upper spacer member slidingly coupled to the central column, a lower spacer member slidingly coupled to the central column below the upper spacer member, and at least three folding legs linked to the central column, wherein each leg having an end portion rotationally joined to the upper spacer member and having a linkage that rotationally links a mid-portion of each leg to the lower spacer member;

a remote data transmit module housing coupled to an upper end of the central column of the support member; and wherein the support and the remote data transmit module housing are releasably coupled to the extendable pole.

8. The apparatus as recited in claim 7, further including clamps integral with the upper spacer member to restrict rotation of the legs.

9. The apparatus as recited in claim 8, wherein the upper spacer member further includes fingers extending outwardly from a central portion of the upper spacer member, wherein the fingers are adapted for gripping a sensor.

10. The apparatus as recited in claim 7, further including slots formed in the upper spacer member wherein the slots are adapted for receiving a sensor probe.

11. The apparatus as recited in claim 9, wherein the sensor is of the type capable of communicating with the remote data transmit module.

12. A method for continuously positioning a sensor above a crop growth canopy, the method including the steps of:

providing at least one field unit for positioning within a boundary of a crop growth canopy, wherein the field unit includes:

an extendable pole capable of extending between a lowered and raised position, the extendable pole having a coupling to secure the pole in a fixed lowered position and a fixed raised position;

an arm member extending outward from an upper end of the pole;

a sensor mount positioned at an outer end of the arm member;

a support having a central column, an upper spacer member slidingly coupled to the central column, a lower spacer member slidingly coupled to the central column below the upper spacer member, and at least three folding legs linked to the central column, wherein each leg having an end portion rotationally joined to the upper spacer member and having a mid-portion rotationally joined to the lower spacer member;

a remote data transmit module housing coupled to an upper end of the central column of the support member;

wherein the support and the remote data transmit module housing are releasably coupled to the extendable pole and wherein the arm member is adjustable to remain above the crop growth canopy;

linking wirelessly the field unit to a base station; and transmitting data from the field unit to the base station.

13. The method as recited in claim 12, further including the step of positioning soil sensors below the crop canopy.

14. The method as recited in claim 12, further including the step of adjusting the arm member to remain above the crop growth canopy.

15. The method as recited in claim 12, further including the step of coupling at least one sensor to the arm member.

16. The method as recited in claim 15, wherein the sensor transmits data associated with at least one of ambient light, air humidity, and air temperature.

17. The method as recited in claim 15, wherein the sensor coupled to the arm is selected dependent upon the crop growing in the crop growth canopy.

* * * * *